Patented Sept. 19, 1939

2,173,260

UNITED STATES PATENT OFFICE 2,173,260

METHOD OF CONTROLLING CERTAIN JELLING PROPERTIES OF PECTIN

Herbert T. Leo, Clarence C. Taylor, and John W. Lindsey, Anaheim, Calif., assignors to Mutual Citrus Products Co., Inc., Anaheim, Calif., a corporation of California No Drawing. Application May 2, 1938,
Serial No. 205,654

9 Claims. (Cl. 260—210)

This invention relates to a method of measuring and controlling certain jelling properties of extracted pectins.

One of us, H. T. Leo, devised in 1921 a method now commonly used for measuring the jelly grade of pectins, which term signifies the number of parts of sugar added to one part of pectin under standard conditions to produce a jelly of a specified strength. This test is carried out as follows:

5 grams of the pectin to be tested, 500 grams sugar and 325 cc. water are measured out. The water is put in a kettle; the pectin is mixed with part of the sugar, and the mixture is stirred into the water which is heated with constant agitation. By the time the water is boiling the pectin is in solution. The balance of the sugar is now added, and the mixture is boiled to a total weight of 770 grams. It is then poured into tumblers of a capacity of 170 c. c. containing 2 c. c. "preservers' acid", which is a solution of one-half pound of citric acid in one pint of water. The sugar solution in the tumbler is then of a 65% strength and has a pH of 2.30. If the pectin is 100 grade, the jelly formed should be firm enough to withstand shipping, it should stand up when turned from the glass, but it should not be too firm to spread on bread. If the pectin is of a higher grade, the jelly will be firmer and if the pectin is of a lower grade, the jelly will be looser. A few trials varying the amount of pectin used will determine the exact grade of the pectin.

It is known that under the standard conditions of this test different samples of pectin do not cause the formation of a jelly within the same period of time.

From this fact some prior workers have drawn the conclusion that one of the inherent, intrinsic and fundamental characteristics of a pectin is its setting time, which is supposed to be a measure of its inherent ability to cause a jelly batch to jell at a certain definite rate. More particularly, the setting time of a pectin has been defined as that interval of time which elapses between the instant at which a jelly batch prepared as in H. T. Leo's test and containing standard proportions of sugar, acid, pectin and total solids is formed and that at which jellification into a coherent mass can be observed.

We have discovered that the term "setting time" corresponds to no inherent, intrinsic and fundamental characteristic of pectin. We have discovered that a pectin does not have a characteristic ability to cause jelly formation at a certain definite rate and that consequently the term "setting time" as applied to pectins is without important significance.

It is known that the interval of time within which jelly formation in a solution containing a definite pectin takes place is a function of the pH of the solution, the other factors, as for instance the concentration of sugar in this solution, being constant.

If, for instance, instead of 2 c. c. of preservers' acid used in the H. T. Leo test for jelly grade, which gives a pH of 2.30, an amount of acid sufficient to give a pH of 3.00 is used, the formation of jelly requires a longer period of time. At a pH of 3.25 the formation of the jelly requires a still longer period of time, all other conditions remaining the same. The final texture of all three jellies may be the same.

We have discovered that a pectin has a definite characteristic ability to form a jelly within a certain temperature range at a definite pH.

An example illustrating this discovery will now be given.

Three different samples of 100 grade pectin are prepared. The first sample consists of pectin prepared from grapefruit peel by an extraction at a pH of 2.60 for thirty minutes. The second sample consists of pectin prepared from firm lemon peel by an extraction at a pH of 2.60 for thirty minutes. The third sample consists of pectin prepared exactly as the second sample but treated further by heating in aqueous solution at a pH between 1.25 and 1.40 at 140° to 170° for a definite time. The length of this treatment will be disclosed later in this application.

These three samples of pectin are made into aqueous syrups containing 65% sugar as specified in the H. T. Leo test for jelly grade, and poured into eight-ounce glass tumblers, each of which contains 2 c. c. of 50% citric acid solution, to form a syrup of a pH of 2.30.

As these tumblers cool, it will be noticed that the solution containing the first sample of pectin forms a firm jelly at a temperature of 202° F.; the solution containing the second sample of pectin forms a firm jelly at a temperature of 218° F.; the solution containing the third sample of pectin forms a firm jelly at a temperature of 170° F.

Although these three samples of pectin cause a formation of jelly within different periods of time after the syrups have been poured into the tumblers, the length of this period of time is not a measurement of the so-called inherent ability of a pectin to cause jelly formation to proceed in a jelly batch at a certain definite rate. The length of this period of time is a measurement of the time required for the jelly batch to cool to a temperature at which a firm jelly is formed and it is a function of this temperature and of the factors affecting the rate of cooling of the jelly batch, among which are the size, shape, and material of construction of the container, the difference in temperature between the jelly batch and the atmosphere, and the like.

The formation of jelly is an action which starts when the jelly batch has reached a certain temperature during cooling and then is completed within a comparatively limited temperature range. The third sample taken in the example can be prevented from forming a jelly by being kept at a temperature above 170° F.

A pectin may thus be said to have an inherent ability to cause jelly formation within a certain temperature range at a specified pH. For practical purposes it is more convenient to take as a standard the temperature of set at a specified pH, by which term, as used hereinafter, is meant that temperature at which an aqueous pectin syrup prepared according to the H. T. Leo test for jelly grade and having the specified pH will set to a firm jelly on cooling. This intrinsic property of pectins is herein also specified as the pH of set at a specified temperature.

We have further discovered that pectins having a temperature of set of less than 218° at a pH of 2.30 are radically different from pectins having a temperature of set of 218° F. at a pH of 2.30, in that the former pectins cannot be made to effect jelling at 218° F. by lowering the pH of the jelly batch. Consequently, this invention is not applicable to pectins having a temperature of set of less than 218° at a pH of 2.30. The poorer texture of jellies prepared with pectins having a temperature of set of less than 218° F. at a pH of 2.30, indicates the probability of some destruction of the pectin during its treatment.

In United States Patent No. 1,611,528 issued to Jameson it is stated that unless the acidity of a pectin preparation falls within the limits of pH 3.4 to 7.0, the pectin preparation is not satisfactory for jelly making, since it will set in the cooking kettle before it can be poured. Using our terminology, this statement is the equivalent of saying that the pH of set at 218° F. of all satisfactory pectins is less than 3.4 or of saying that all satisfactory pectins have a temperature of set below 218° F. at the pH range 3.4 to 7.0.

The statement of Jameson just cited is not correct. Satisfactory pectins having a pH of set at 218° F. as low as 2.30 have been known for many years.

U. S. Patent No. 1,497,884, issued in 1924 to Jameson, Taylor and Wilson, describes a method of preparing a pectin product which comprises washing the dried ground pectin with alcohol containing hydrochloric acid. If this pectin is not ground much finer than is ordinarily done in similar processes, the time required for washing is about 3 hours, and the pectin produced has a pH of set at 218° F. which is considerably below 3.4. Such pectin has been on the market since 1924.

U. S. Patent No. 1,838,949, issued in 1931 to H. T. Leo, C. C. Taylor and F. A. Beck, discloses the extraction of pectin by an aqueous medium of a pH of 1.23 for about 20 minutes to prepare a pectin which at a pH of 2.34 has a temperature of set less than 218° F.

U. S. Patent No. 1,892,536 issued in 1932 discloses a method for the extraction of pectin by an aqueous medium having a pH as low as 1.00, for about 30 minutes. This process will also produce a pH of set at 218° F. which is considerably below 3.4.

U. S. Patent No. 2,020,572 issued in 1935 to Platt describes a pectin of "long setting time" prepared by an extraction with an aqueous medium of a pH of 1.2 to 1.9.

In all of the processes disclosed in the four patents just referred to, the temperature of set of the pectin has been lowered by treatment with acidic agents. That some inventors have been aware of this casual relation is evident from U. S. Patent No. 1,838,949 where it is stated that the pH required for making a good jelly from the pectin produced is 2.34, or in other words that the temperature of set at a pH of 2.34 is less than 218° F., and from U. S. Patent No. 2,020,572 where there is a graphic representation of the relationship of the pH of extraction and the "setting time" of the pectin extracted.

None of these patents shows an appreciation of the nature of the casual relationship between the treatment with acidic agents and the production of a pectin having a lowered temperature of set. No such appreciation is possible without a correct perception of the true nature of the effect of the acidic treatment which is not the shortening of a "time of setting" but is the lowering of the temperature of set at a specified pH or the corresponding increase of the pH of set at a specified temperature.

Those skilled in the production of pectin have hitherto been unable to control the temperature of set of pectins. The reason is now obvious.

The properties that adapt pectin to its commercial uses are its ability to hold vast quantities of water, which is recognized by the great viscosity of the colloidal aqueous solutions of pectins; the lowered surface tension of these colloidal aqueous solutions; and the ability of these colloidal aqueous solutions to form or not to form jellies under certain conditions.

Because of these properties, pectins are used commercially for many different purposes, such as for making jellies and jams of various types, for thickening ice cream, as an ingredient in the preparation of meringues and marshmallows, for preparing emulsions of oils in water, as substitutes for certain gums, as protective colloids.

The importance of the possibility of producing a pectin having a predetermined temperature of set can be realized from a consideration of the many different conditions under which a pectin is used. Limiting the discussion to jams and jellies, it is evident that since these materials are made from juices having various pH values and that since, due to factors peculiar to a particular plant, it might be desirable to pour it into containers at a particular temperature, the use of a pectin of a specific temperature of set at a specified pH and consequently of a specific pH of set at a particular temperature would mean an important improvement in the art of making jellies and jams.

The well-known H. T. Leo test for jelly grade offers a means of measuring one aspect of the ability of pectins to form jellies, but hitherto there has been no means of measuring the remaining aspect of this ability, which aspect concerns the ability of pectins to form or not to form jellies at specified temperatures and at specified pH values.

It is evident, then, that since one of the most important properties of pectins is their ability to form or not to form jellies under certain conditions, adequate methods of quantitatively measuring, expressing and controlling the hitherto only imperfectly understood aspects of this ability would mean a revolutionizing improvement in the art of preparing pectins.

It is therefore an important object of this invention to provide a method of determining and controlling the ability of a pectin to form a jelly at specified temperatures and pH values.

Another important object of this invention is to provide a method for the preparation of a pectin having a predetermined temperature of set at a specified pH.

Other and further important objects of this invention will become apparent from the following description and appended claims.

As pointed out hereinbefore, it is already known that there is some casual relationship between a treatment or extraction of pectin at a low pH and the preparation of a pectin having a "long setting time."

We have discovered that the time and the temperature, as well as the pH value, of the medium used in preparing a pectin determine the temperature of set of the pectin prepared. The concentration of the pectin is another factor. We have discovered that with proper control of the four variable factors of concentration of pectin, pH, temperature and time of extraction or treatment, a pectin having any desired temperature of set may be prepared either by extraction or by treatment of pectin already extracted.

As is well known, various fruits and vegetables contain pectous substances, or protopectin, which may be extracted by means of various media, but particularly by means of aqueous acid solutions. The acid extraction method is particularly applicable to citrus fruits, such as grapefruit, lemon, lime and the like. This invention, however, is not intended to be restricted to any particular source of pectous material nor to any particular method of extraction, so long as the preparation of the pectin involves the treatment of the pectin in soluble or colloidal form by an aqueous acid medium.

The following will serve to illustrate a preferred embodiment of our general method of extracting pectin from citrus fruits to prepare pectins having definite temperatures of set:

*Example 1.—Preparation of a pectin of a temperature of set of 170° F. at a pH of 2.70*

200 gallons of lemon peel, ground and washed, are placed in a wooden cook-tank provided with wooden agitators and equipped with live steam pipes for heating. 180 gallons of water, to which has been added 1 quart of concentrated sulfuric acid, are next charged into the tank, and steam is turned on to heat the entire mass to exactly 170° F. At this point, 3 more quarts of concentrated sulfuric acid are added. By this time the volume reaches about 420 gallons and the pH is about 1.50. The temperature of 170° F. is maintained for a total period of 2 hours, after which a sample is taken to determine whether or not the pectin has acquired the desired temperature of set. If the test, which is described in detail below, shows up satisfactorily, cold water is introduced into the tank and a sufficient quantity of a buffer salt, such as sodium bicarbonate, sodium acetate, sodium sulphite or the like, added to raise the pH to 2.80 to 3.00. 150 pounds of a filter aid, such as "Hyflo-filtercel," are added and thoroughly incorporated into the mass, which is thereafter pumped into a press filter and the pectous liquor pressed out. If a dry pectin is desired, the pectous liquor from the press filter is concentrated to one-half its volume and the pectin precipitated out with alcohol, dried and pulverized.

The test above referred to is carried out as follows:

To 1 quart of the extraction liquor is added sufficient 10% sodium acetate solution to bring the pH to 2.70. To 300 c. c. of the 2.70 pH pectous liquor are added 500 grams of sugar and the mixture boiled to exactly 770 grams, after which it is removed from the fire, skimmed and poured into glasses. If, however, the mass indicates jelly action in the kettle, it is very apparent that the action has not been prolonged sufficiently and heating will have to be continued. The final test should show no jell action in the kettle, but the jelly mass should set at temperature of 170° F. at a pH of 2.70.

The dry pectin so obtained is then standardized with corn sugar to 100 grade, in accordance with the usual method introduced by one of us, H. T. Leo. The standardized pectin is then checked as follows:

To 325 c. c. of water plus citric acid to a pH of 2.70 are added 5 grams of the 100-grade standardized pectin and 500 grams of sugar. The pectin is dissolved in the water first, heated to a boil and the sugar added, after which the entire mass is boiled to exactly 770 grams and removed from the fire, skimmed and poured into glasses. If the previous final test on the cook was satisfactory, no jell action will take place in the kettle but will occur at the same temperature of 170° F. as was noted in the test sample at a pH of 2.70.

If it were decided to produce a second pectin having a temperature of set of 170° F. at a pH of 2.50, longer processing would be necessary and this second pectin so produced would have a different temperature of set at a pH of 2.70. The second jelly, which at a pH of 2.50 has the same temperature of set of 170° F. as the first jelly at a pH of 2.70, has at a pH of 2.70 a lower temperature of set than the first jelly.

In accordance with our control method, the progress of the pectin change due to the acidity of the extraction liquor, whether it be a pH of 1.25 or 1.60, or any other pH, can be determined. The extraction step may therefore be controlled by the above-described testing method so that the final pectin will not produce a jelly that will jell in the kettle, but will produce a jelly having any desired temperature of set at a specified pH.

Although in the specific example given, a temperature of extraction of 170° F. was specified, the temperature may obviously be varied anywhere from room temperature to about 170° F., the time of extraction being inversely varied as the temperature is increased. The pH values of the extracting medium may also be varied below 3.00 to compensate for shortening of the time or lowering the temperature of the extraction.

However, since the control test takes about 15 to 20 minutes, it is preferable to use a pH and temperature that will require a period of extraction or digestion of at least 2 hours, as indicated in the above preferred example. In general, the pH may be between about 1.0 and 3.0, and the temperature should not be substantially above 170° F., preferably between about 140° and 170° F. Using a pH within the range indicated and a temperature between the limits indicated, at least 2 hours are required for the treatment of pectin at this concentration of about ½% to convert it into a pectin having a temperature of set of 218° at a pH of 2.30. One or more control tests, each of which requires 15 to 20 minutes, can thus be made during the course of the treatment of the pectin, so that by the time a satisfactory test has been obtained, the treatment can be interrupted or arrested.

The preferred manner of arresting the action of the aqueous acid solution is to dilute the extraction mass with cold water and promptly raise the pH numerically by the addition thereto of a salt of a strong base and a weak acid, such as sodium acetate, sodium citrate, sodium tartrate, or the like. It will be understood, however, that just as any acid can be used in place of sulfuric acid, such as hydrochloric acid, phosphoric acid, oxalic acid or the like, so any suitable alkaline reacting substance can be used in place of the sodium acetate specified in the preferred example. The important thing is to control the acidity within the pH limits specified during the extraction or digestion period, and then promptly to raise the pH to at least 2.70 when the conversion of the pectin into a pectin having the desired temperature of set has been completed.

We have discovered that lemon peel must be extracted for at least 2½ hours at a temperature of 170° F. and a pH of 1.50 to give a pectin having a pH of set of 2.30 at 218° F., the concentration of the pectous liquor being about ½%. A temperature of about 160° F. is suitable for a similar extraction of oranges and grapefruit. These are the optimum conditions for average condition fruit. For very green fruit the time may be prolonged to three hours and for overripe fruit shortened to an hour and a half.

*Example 2*

This example illustrates one method of a controlled preparation of a pectin of a temperature of set of 150° F. at a pH of 2.50 by the acidic treatment of a pectin already prepared.

An aqueous pectin solution is first prepared by extraction of fruit or vegetable fibers as follows:

The fruit or vegetable fibers are freed from juice or water soluble materials by grinding or washing. The mass is diluted with acid solution, preferably hydrochloric acid, to a pH of about 2.40 to 2.60 and the temperature raised to or near the boiling point and maintained at that temperature for about 30 to 60 minutes. The pectin is practically all extracted by this time. The pH is now reduced to about 3.00 by neutralization, diatomaceous earth is added, and the mass is filtered on the Leo press or some other suitable filter press.

The filtered pectous liquor is now concentrated under vacuo so that one gallon has sufficient jelly units to jell 50 pounds of sugar at 65% sugar concentration.

This concentrate is now subjected to an acidic treatment to lower the temperature of set of the pectin.

The concentrate is placed in wooden tanks and sufficient hydrochloric acid is added to lower the pH to between 1.25 and 1.40. The temperature is raised to between 140° and 170° F. and the mass is allowed to stand at this temperature until the desired reaction has taken place. This time varies with the pH and the temperature. Its length is determined by making the following tests.

85 c. c. samples are taken, diluted with 215 c. c. of water and placed on a calomel-quinhydrone cell. Small portions of 5% solution of sodium acetate are added until a pH of 2.50 is reached. The amount needed usually varies between 7 and 12 c. c. To the sample there is then added 500 grams sugar, and the mixture is boiled until it contains exactly 65% sugar. The acidic treatment is interrupted when the syrup on cooling forms a firm jelly at 150° F. This treatment will require from 12 to 30 hours.

This example shows the influence of the concentration of the pectin subjected to the action of a low pH in determining the temperature of set obtained.

These illustrative examples serve to show that we have discovered a method of controlling the imperfectly comprehended action of acidic agents on pectins to prepare pectins having predetermined temperatures of set at specified pH values.

Our invention consists, thus, in a method of preparing pectins which differs from all known methods of preparing pectins. The difference is that the acidic extraction or treatment of the pectin is carried out at such an effective rate that it can be and is combined with a determination of the temperature of set of the pectin at a specified pH at least one stage of the acidic extraction or treatment before the end thereof. This determination is used as a guide indicating when the acidic extraction or treatment should be stopped in order that the pectin prepared should have the desired temperature of set at the desired pH value.

The procedure in determining the temperature of set at a specified pH is similar to that used in carrying out the well-known H. T. Leo method of determining the jelly grade of a pectin, except that an amount of preservers' acid sufficient to cause the specified pH is used. By means of a thermometer the exact temperature at which a firm jelly is formed is determined. This temperature is then the temperature of set at the specified pH of this particular pectin.

The temperature of set at other pH values may be determined similarly. It is, of course, to be expected that a temperature of set of 218° F., the boiling point of a 65% aqueous sugar solution, will be obtained for all pH values below a certain minimum characteristic of each pectin.

The temperature of set of a pectin not exactly 100 jelly grade may be determined similarly, taking into consideration the looser or firmer jellies that will be formed or compensating therefor.

The pH of set at a specified temperature of a pectin may be determined by preparing 65% aqueous sugar solution containing pectin as directed in the well-known H. T. Leo test and while decreasing the pH value of this syrup noting the minimum pH at the specified temperature at which it remains a syrup which can be skimmed and poured freely.

We are aware that numerous details of the process may be varied through a wide range without departing from the principles of this invention, and we therefore do not purpose limiting the patent granted hereon otherwise than necessitated by the prior art.

We claim as our invention:

1. The method of lowering the temperature of set of a prepared pectin at a desired pH value which comprises treating said pectin with an aqueous acidic medium in such a manner that the total effective time of treatment will be at least two hours, determining at at least one of the stages of the treatment before the end thereof the temperature of set of the pectin at the desired pH value and arresting said treatment when said determination indicates that said treatment has effected the desired lowering of the temperature of set of the pectin at the desired pH value to prepare a pectin having a predetermined lowered temperature of set at a desired pH value equivalent to a temperature of set of 218° F. at a pH of 2.30.

2. The method of extracting pectin from pectous materials which comprises extracting said pectous materials with an aqueous acidic medium at such an effective rate that a determination of the changes in gelling tendency effected in said pectin during said extraction can be carried out at at least one of the stages of said extraction before the end thereof, removing a sample of the pectous material being extracted at a stage of said extraction before the end thereof, subjecting such sample to a test that will indicate its gelling tendency at that stage of the extraction and interrupting said extraction when such a test establishes that the extracted pectin possesses the desired temperature of set at a given pH, which temperature of set is equivalent to 218° F. at a pH of 2.30.

3. The method of controlling the pH of set at a specified temperature of a pectin within the range characterized by a temperature of set of 218° F. at a pH of 2.30 which comprises treating pectous material with an aqueous acidic medium at such an effective rate that a determination indicating the pH of set at the specified temperature can be carried out at at least one of the stages of said acidic treatment before the end thereof, removing a sample of the pectous material undergoing treatment at a stage of said treatment before the end thereof, subjecting such sample to a test that will indicate the pH of set of said pectous material at the specified temperature at that stage of said treatment and interrupting said treatment when said test indicates that the pectin possesses the desired pH of set at the specified temperature.

4. In a method of extracting pectins from pectous materials by means of an aqueous acidic medium, the step which comprises adjusting the pH value of the extracting medium, the temperature of extraction and the concentration of the pectin in the extracting medium in such a manner that the total effective time of extraction will be at least two hours, determining at at least one of the stages of the extraction before the end thereof the temperature of set of the pectin at a desired pH value and arresting said extraction when such determination indicates that said extraction has effected a suitable temperature of set of the pectin at the desired pH value, said final temperature of set being equivalent to a temperature of set of 218° F. at a pH of 2.30.

5. The method of controlling the temperature of set of pectin at a specified pH value, which comprises subjecting pectin to the action of an aqueous acid solution of a pH between 1.0 and 3.0 at a temperature not substantially above 170° F., removing and testing a sample of the resulting solution to determine the temperature of set of the pectin content at the specified pH value of such sample at the time of its removal, and, when said test indicates a satisfactory temperature of set at the specified pH value, interrupting the action of said aqueous acid solution to recover pectin having the desired temperature of set at the specified pH value, the temperature of set of the recovered pectin being equivalent to a temperature of set of 218° F. at a pH of 2.30.

6. The method of controlling the temperature of set of pectin at a specified pH value, which comprises subjecting pectin to the action of an aqueous acid solution of a pH between 1.0 and 3.0 at a temperature between about 140° and 170° F., removing and testing a sample of the resulting solution to determine the temperature of set of the pectin content at the specified pH value of such sample at the time of its removal, and, when said test indicates a satisfactory temperature of set, interrupting the action of said aqueous acid solution by dilution with cold water and the addition of a buffer salt to numerically increase the pH of the solution above about 2.7 to recover pectin having the desired temperature of set at the specified pH value, the temperature of set of the recovered pectin being equivalent to a temperature of set of 218° F. at a pH of 2.30.

7. The method of controlling the temperature of set of pectin at a specified pH value, which comprises subjecting pectin to the action of an aqueous acid solution of a pH of about 1.25 at a temperature between about 140° and 170° F., removing and testing a sample of the resulting solution to determine the temperature of set of the pectin content at the specified pH value of such sample at the time of its removal, and, when said test indicates a satisfactory temperature of set at the specified pH value, interrupting the action of said aqueous acid solution by dilution with cold water and the addition of a buffer salt to numerically increase the pH of the solution above about 2.7 to recover pectin having the desired temperature of set at the specified pH value, the temperature of set of the recovered pectin being equivalent to a temperature of set of 218° F. at a pH of 2.30.

8. The method of controlling the temperature of set of pectin at a specified pH value, which comprises extracting pectous material from cellular fibrous matter by means of an aqueous acid solution to form a pectin sol, adjusting the pH and temperature of said aqueous acid solution so that the total time required to obtain a pectin having the desired temperature of set at a specified pH value will be at least two hours, testing a sample of the resulting extraction liquor to determine the setting properties of the pectin content thereof, when such test indicates a suitable temperature of set at the specified pH value arresting further action of said aqueous acid solution and recovering pectin from said resulting extraction liquor, the temperature of set of the recovered pectin being equivalent to a temperature of set of 218° F. at a pH of 2.30.

9. The method of controlling the temperature of set of pectin at a specified pH value, which comprises extracting pectous material from cellular fibrous matter by means of an aqueous acid solution to form a pectin sol, adjusting the pH and temperature of said aqueous acid solution so that the total time required to obtain a pectin having the desired temperature of set at the specified pH value will be at least two hours, testing a sample of the resulting extraction liquor to determine the setting properties of the pectin content thereof, when such test indicates a suitable temperature of set at the specified pH value arresting further action of said aqueous acid solution by dilution of said extraction liquor and the addition thereto of a salt of a strong base and a weak acid, and recovering solid pectin from said resulting extraction liquor, the temperature of set of the recovered pectin being equivalent to a temperature of set of 218° F. at a pH of 2.30.

HERBERT T. LEO.
CLARENCE C. TAYLOR.
JOHN W. LINDSEY.